Feb. 15, 1955
L. L. JOHNSTON
2,701,900
METHOD AND APPARATUS FOR FORMING MOLDS
Filed Dec. 22, 1950
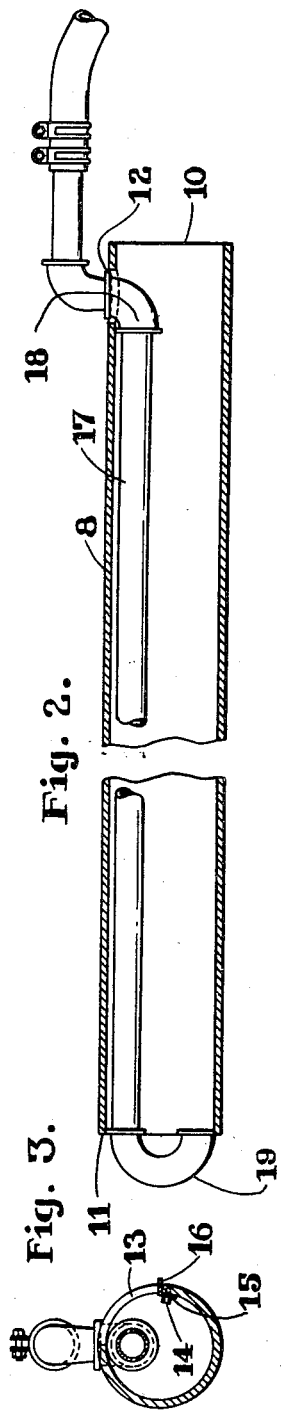
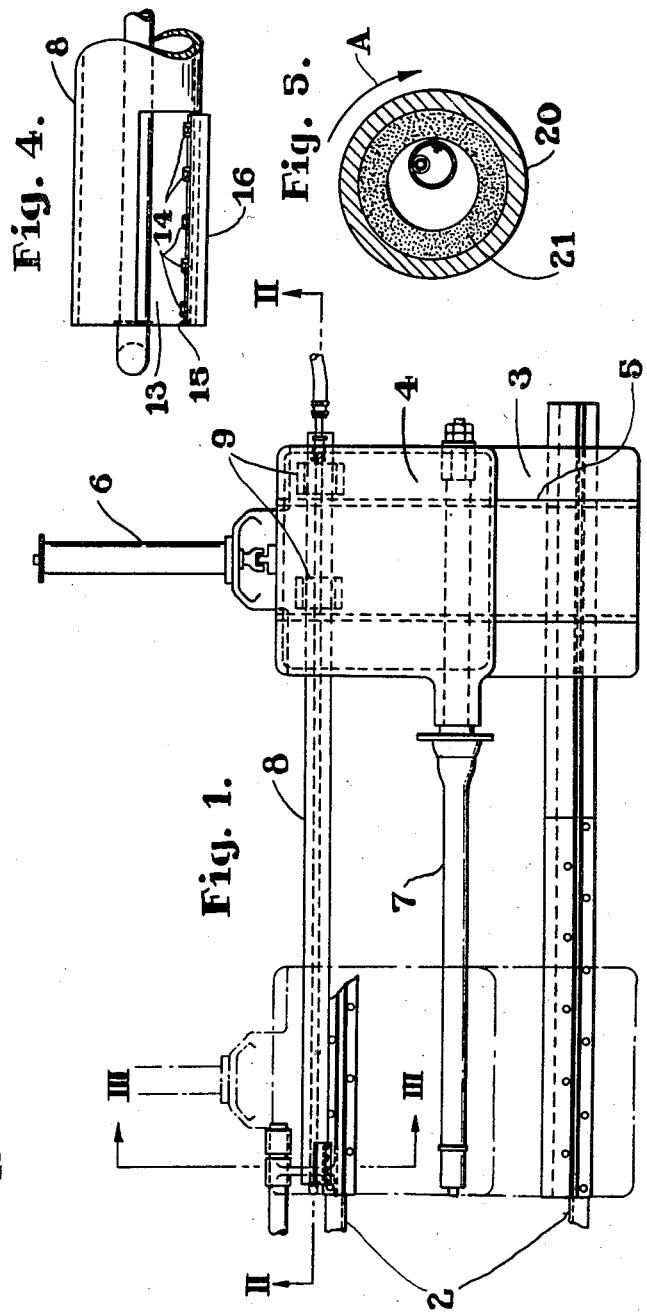
INVENTOR.
LOYAL L. JOHNSTON

---

United States Patent Office 2,701,900
Patented Feb. 15, 1955

---

2,701,900

METHOD AND APPARATUS FOR FORMING MOLDS

Loyal L. Johnston, Zelienople, Pa., assignor to Herman Pneumatic Machine Company, Pittsburgh, Pa., a corporation of Pennsylvania Application December 22, 1950, Serial No. 202,332

5 Claims. (Cl. 22—24)

This invention relates to a method of and apparatus for forming molds. It relates to a new way of forming in a flask a mold of finely divided mold forming material such, for example, as sand.

The invention will be described in connection with the forming of a sand mold for the centrifugal casting of elongated hollow articles. In my Patent No. 2,449,900 there is disclosed apparatus for forming a mold of compacted finely divided mold forming material for the centrifugal casing of elongated hollow articles. According to my patent finely divided mold forming material is introduced into a flask and a portion of the mold forming material is removed by a device comprising a tube with a screw conveyor therein. Thereafter a mandrel compacts the mold forming material remaining in the flask to complete formation of the mold.

I have devised a relatively simple yet highly effective device for removing from the flask a portion of the mold forming material and roughly forming the mold prior to compacting of the mold forming material. My device is quite inexpensive but operates at high speed and can be used in the formation of molds of various sizes.

I provide for ejecting or removing the excess mold forming material pneumatically. This is preferably done by blowing the material through an elongated pipe-like element. Desirably such element is supported at one end for advancement into the mold being formed. Preferably the mold being formed is rotated while being thus operated upon. The elongated element preferably carries cutting means at its forward end so that as it is advanced into the mold a portion of the mold forming material is cut away. The elongated element preferably has an opening in its wall adjacent its forward end into which the cut material passes. A blower preferably enters the elongated element from the rear end thereof and passes internally thereof to the forward end where it has a nozzle directed rearwardly so that the cut material is blown rearwardly through and out of the elongated element during operation thereof.

My new method comprises simultaneously cutting mold forming material from the inner surface of a hollow open-ended body of mold forming material, catching the cut material and ejecting the caught material. The ejecting is preferably done pneumatically, desirably by blowing the cut material out of the hollow open-ended body of mold forming material. The cutting is preferably effected progressively along the hollow open-ended body of mold forming material, which body is preferably turned during the cutting operation. I preferably support the cut material independently of the body and blow the thus supported cut material out of the body.

Other details, objects and advantages of the invention will become apparent as the following description of a present preferred embodiment thereof and a present preferred method of practicing the same proceeds.

In the accompanying drawings I have shown a present preferred embodiment of the invention and have illustrated a present preferred method of practicing the same in which Figure 1 is a plan view of a portion of an apparatus for forming molds for centrifugal casting of the type of the apparatus disclosed in my Patent No. 2,449,900 but embodying my improved means for cutting mold forming material from the inner surface of the mold being formed;

Figure 2 is an enlarged fragmentary central vertical cross sectional view through the means for cutting and removing material from within the mold, taken on the line II—II of Figure 1;

Figure 3 is an enlarged fragmentary transverse cross sectional view through the means for cutting and removing material from within the mold, taken on the line III—III of Figure 1;

Figure 4 is a greatly enlarged fragmentary plan view of the forward end of the means for cutting and removing material from within the mold, and Figure 5 is a diagrammatic transverse cross sectional view showing the operation of my improved apparatus in forming a mold.

The apparatus shown in Figure 1 is of the same type as that shown in my Patent No. 2,449,900, comprising guideways 2 upon which is mounted for controlled movement in the direction from right to left and vice versa viewing Figure 1 a carriage 3 which in Figure 1 is shown in retracted position in solid lines at the right hand portion of the figure and in advanced position in chain lines at the left hand portion of the figure. The carriage may be moved back and forth by any suitable mechanism such as the mechanism disclosed in my said patent.

Mounted on the carriage 3 for back and forth movement in the up and down direction viewing Figure 1 is a carrier 4 which has a dove tail connection 5 with guide means on the carriage as disclosed in my said patent. The carrier 4 is moved relatively to the carriage 3 by piston and cylinder means designated generally by reference numeral 6 and functioning as explained in my said patent. The carrier 4 carries a mandrel 7 which may be identical with the corresponding element disclosed in my said patent.

The carrier 4 also carries an elongated pipe-like element designated generally by reference numeral 8, that element being supported at its rearward or right hand end viewing Figure 1 by being fastened to the upper surface of the carrier by straps or other suitable fastening means 9. The element 8 is thus immovably attached to the carrier 4 but its position on the carrier may be adjusted by loosening the fastening means 9.

The element 8 in the form shown is a piece of circular pipe or tubing whose rearward and forward ends are designated respectively by reference numerals 10 and 11. The element 8 has a hole 12 in the top thereof adjacent its rearward end and an opening 13 at its forward end. The opening 13 is formed by removing from the forward portion of the element 8 for a short distance back from the forward end 11 thereof a segment consisting of one-fourth of the element, circumferentially considered. The segment which is removed is the upper right hand quarter of the element, viewing Figure 3. The opening 13 is to receive cut away mold forming material as will presently be described.

Fastened to the element 8 by bolts 14 is a cutting member shown in plan in Figures 1 and 4 and in cross-section in Figures 3 and 5. The cutting member is in the form of a plate bent at an angle so as to have two portions thereof extending at an angle to each other, one of such angularly extending portions being designated 15 and lying within the element 8 while the other such portion is designated 16 and projects out of the element 8 substantially beyond the outer surface thereof. The bolts 14 pass through the portion 15 of the cutter.

Disposed within the element 8 is a pipe 17. At its rearward end the pipe 17 communicates through connections 18 passing through the opening 12 with a source of fluid under pressure, preferably compressed air. At its forward end the pipe 17 carries a nozzle 19 which directs compressed air moving from right to left through the pipe 17 viewing Figure 2 in the reverse direction so that the air moves at high velocity from left to right within the element 8.

My apparatus is used in conjunction with a rotatable open-ended flask as shown in my said patent. Since my present invention does not relate to the structure of the flask I have not shown it in the drawings except in cross-section at 20 in Figure 5. However it will be understood that a flask, which may be of the type shown in my said patent, will be mounted to the left of the apparatus shown in Figure 1.

I shall describe the operation of my method and apparatus. The flask with finely divided mold forming material therein is rotated at substantial speed to cause the mold forming material by centrifugal action alone to be somewhat compacted against the inner wall of the flask; this results in formation of an axial hole or bore through the mold forming material. With the flask rotating at centrifugal speed the carriage 3 with the carrier 4 positioned thereon so that the element 8 enters the flask is advanced toward the left viewing Figure 1. The element 8 is disposed with the outer edge of the cutter portion 16 at a predetermined radial distance from the inner surface of the flask and so as to cut away as the element 8 advances into the flask a portion of the mold forming material which in the example under discussion is sand. The sand which is thus progressively cut from the inner surface of the mold being formed as the element 8 advances into the flask enters the element 8 through the opening 13 and so is supported independently of the mold and is segregated from the mold. The blast through the nozzle 19 blows the cut sand from left to right viewing Figure 2 out of the end 10 of the element 8 where it is collected by any suitable means. Thus I remove from within the mold being formed a portion of the mold forming material in a simple, rapid and expedient manner with apparatus of great simplicity and low cost. If a relatively great amount of mold forming material is to be cut away and removed from within the flask the element 8 may be operated through more than one pass, being moved to a position somewhat more eccentric relatively to the flask upon each succeeding pass. Normally one or two passes will suffice. During operation of my apparatus the flask rotates in the clockwise direction viewing Figures 3 and 5. The arrow A in Figure 5 indicates the direction of turning of the flask with the mold being formed therein while the mold forming material is being cut away by the cutter 16 and removed pneumatically through the element 8. The mold in process of formation is designated by reference numeral 21.

After the desired amount of mold forming material has been removed by the element 8 it is withdrawn from within the flask and the mandrel 7 is introduced to compact the mold forming material in the flask to finish formation of the mold as described in my said patent.

While I have shown and described a present preferred embodiment of my invention and a present preferred method of practicing the same it is distinctly understood that the invention is not limited thereto but may be otherwise variously embodied within the scope of the following claims.

I claim:

1. A method of forming a mold comprising disposing finely divided mold forming material in a flask with a central opening through the mold forming material and simultaneously cutting away progressively axially of the flask an inner annular layer only of mold forming material from within the opening, catching the cut material in a generally tubular container and ejecting the caught material generally horizontally endwise from the container.

2. A method of forming a mold comprising disposing finely divided mold forming material in a flask with a central opening through the mold forming material and simultaneously cutting away an inner annular layer only of mold forming material from within the opening, catching the cut material in a generally tubular container and pneumatically removing the caught material endwise from the container.

3. A method of forming a mold comprising disposing finely divided mold forming material in a flask with a central opening through the mold forming material and simultaneously cutting away an inner annular layer only of mold forming material from within the opening, catching the cut material in a generally tubular container and blowing the caught material endwise from the container.

4. A method of forming a mold comprising disposing finely divided mold forming material in a flask with a central opening through the mold forming material, turning the flask about its axis and during such turning simultaneously cutting away progressively axially of the flask an inner annular layer only of mold forming material from within the opening, catching the cut material in a generally tubular container and ejecting the caught material generally horizontally endwise from the container.

5. Apparatus for forming a mold comprising a hollow elongated mounting member, cutting means at the side thereof, means supporting the mounting member at one end for advancement into a hollow open-ended body of finely divided mold forming material to bring the cutting means into engagement with the mold forming material to cut material away from the inner surface thereof upon relative rotation between the body of mold forming material and the hollow elongated mounting member, the mounting member having an opening from the outside to the inside thereof through which the cut away material passes to the inside of the mounting member and a tube carried by the mounting member for blowing out the cut away material, the tube extending along the mounting member, having at the previously mentioned end of the mounting member means for connection with a source of fluid under pressure and having at the other end of the mounting member a nozzle directed toward the first mentioned end to blow the cut away material through the mounting member and out of the first mentioned end thereof.

References Cited in the file of this patent

UNITED STATES PATENTS

| | | |
|---|---|---|
| 69,854 | Smith | Oct. 15, 1867 |
| 104,479 | McClelland | June 21, 1870 |
| 111,167 | Bauman et al. | Jan. 24, 1871 |
| 133,277 | Wheeler et al. | Nov. 19, 1872 |
| 313,405 | Davis | Mar. 3, 1885 |
| 1,189,727 | Oakley | July 4, 1916 |
| 1,504,497 | Perry | Aug. 12, 1924 |
| 1,513,350 | Stolle | Oct. 28, 1924 |
| 2,362,136 | Jungersen | Nov. 7, 1944 |
| 2,449,136 | Pattison | Sept. 14, 1948 |
| 2,449,900 | Johnston | Sept. 21, 1948 |

FOREIGN PATENTS

| | | |
|---|---|---|
| 350,246 | Germany | May 29, 1923 |